United States Patent
Baumecker (10) Patent No.: US 10,121,268 B2
(45) Date of Patent: Nov. 6, 2018

(54) DISPLAYING INFORMATION TECHNOLOGY CONDITIONS WITH HEAT MAPS

(71) Applicant: Hewlett-Packard Development Company, L.P., Houston, TX (US)

(72) Inventor: Klaus Baumecker, Boeblingen (DE)

(73) Assignee: ENTIT SOFTWARE LLC, Sunnyvale, CA (US)

( * ) Notice: Subject to any disclaimer, the term of this patent is extended or adjusted under 35 U.S.C. 154(b) by 35 days.

(21) Appl. No.: 14/649,191

(22) PCT Filed: Dec. 4, 2012

(86) PCT No.: PCT/US2012/067792
§ 371 (c)(1),
(2) Date: Jun. 2, 2015

(87) PCT Pub. No.: WO2014/088561
PCT Pub. Date: Jun. 12, 2014

(65) Prior Publication Data
US 2015/0310645 A1    Oct. 29, 2015

(51) Int. Cl.
*G09G 5/00* (2006.01)
*G06T 11/20* (2006.01)
(Continued)

(52) U.S. Cl.
CPC ............ *G06T 11/206* (2013.01); *G06F 3/048* (2013.01); *G06F 9/30* (2013.01); *G06F 11/327* (2013.01); *G06F 17/00* (2013.01); *G06Q 30/02* (2013.01); *G06T 3/00* (2013.01); *G06T 11/001* (2013.01); *G06T 11/60* (2013.01); *H04L 41/22* (2013.01); *H04L 43/045* (2013.01)

(58) Field of Classification Search
None
See application file for complete search history.

(56) References Cited

U.S. PATENT DOCUMENTS 8,285,414 B2    10/2012  Aharoni et al.
9,251,313 B2 *   2/2016  Ross ................... G06F 19/3418
(Continued)

FOREIGN PATENT DOCUMENTS

CN    101854263    10/2010
JP    H0231246 A    2/1990
(Continued)

OTHER PUBLICATIONS

Duez, P. et al., "Ecological Interface Design and Computer Network Management: The Effects of Network Size and Fault Frequency," (Research Paper), International Journal of Human-Computer Studies 63.6, 2005, pp. 565-586.
(Continued)

*Primary Examiner* — Ryan R Yang (57) ABSTRACT

Displaying information technology conditions with heat maps includes determining a severity value of current issues for each configuration item in an information technology system; generating a graph of the configuration items that visually depicts topological relationships between the configuration items, the graph having a heat map overlay; and assigning pixel colors for each configuration item in the heat map overlay according to their severity value.

19 Claims, 5 Drawing Sheets

(51) Int. Cl.
*G06F 9/30* (2018.01)
*G06F 17/00* (2006.01)
*G06F 3/048* (2013.01)
*H04L 12/26* (2006.01)
*G06F 11/32* (2006.01)
*H04L 12/24* (2006.01)
*G06Q 30/02* (2012.01)
*G06T 3/00* (2006.01)
*G06T 11/00* (2006.01)
*G06T 11/60* (2006.01)

(56) References Cited

U.S. PATENT DOCUMENTS

| | | | |
|---|---|---|---|
| 2002/0175956 A1 | 11/2002 | Hand et al. | |
| 2003/0112958 A1* | 6/2003 | Beaudoin | H04M 3/2263 379/221.15 |
| 2006/0048077 A1 | 3/2006 | Boyles et al. | |
| 2008/0259815 A1* | 10/2008 | Gorman | H04L 41/00 370/254 |
| 2010/0039433 A1 | 2/2010 | McGreevy et al. | |
| 2010/0275263 A1 | 10/2010 | Bennett et al. | |
| 2011/0012902 A1 | 1/2011 | Rajagopalan et al. | |
| 2011/0125895 A1 | 5/2011 | Anderson et al. | |
| 2012/0053986 A1 | 3/2012 | Cardno et al. | |
| 2012/0123924 A1 | 5/2012 | Rose et al. | |
| 2012/0143650 A1 | 6/2012 | Crowley et al. | |
| 2012/0254710 A1 | 10/2012 | Flanagan et al. | |
| 2013/0155102 A1* | 6/2013 | Gonia | H04W 64/00 345/629 |
| 2014/0156223 A1* | 6/2014 | Toomre | G06F 17/18 702/179 |
| 2016/0098589 A1* | 4/2016 | Brieu | G06K 9/0014 382/128 |

FOREIGN PATENT DOCUMENTS

| | | |
|---|---|---|
| JP | H0962542 A | 3/1997 |
| JP | H09282253 A | 10/1997 |
| JP | 2002014881 A | 1/2002 |
| JP | 2004013454 A | 1/2004 |
| JP | 2004094701 A | 3/2004 |

OTHER PUBLICATIONS

International Preliminary Report on Patentability received in PCT Application No. PCT/US2012/067792, Jun. 18, 2015, 7 pages.

Japan Patent Office, "Examination Handbook for Patent and Utility Model in Japan," Annex B, Chapter 1, Computer Software Related Inventions, 1.2.1.2 Points to note, updated Mar. 30, 2016, p. 6, available at https://www.jpo.go.jp/tetuzuki_e/t_tokkyo_e/files_handbook_sisna_e/app_b1_e.pdf.

Kairam, S. et al., "GraphPrism: Compact Visualization of Network Structure," (Research Paper), Proceedings of the International Working Conference on Advanced Visual Interfaces, ACM, 2012, 8 pages, available at http://idl.cs.washington.edu/files/2012-GraphPrism-AVI.pdf.

Gregg, B., Visualizing System Latency, ACM Queue, May 1, 2010, 10 pages.

International Searching Authority, The International Search Report and the Written Opinion, Aug. 6, 2013, 10 pages.

Mashima, D. et al., Visualizing Dynamic Data with Maps, Jun. 2011, 15 pages, Dept. of Computer Science, University of Arizona, Arizona, USA.

EP Office Action dated Apr. 11, 2017 for EP Application Number: 12889605.7; pp. 6.

IBM Research Report; Model-Based Automation of Service Deployment in a Constrained Environment; Tamar Eilarn, Michael Kalantar, Alexander Konstantinou. Giovanni Pacifici, IBM Research Division, Thomas J. Watson Research Center, P.O. Box 704, Yorktown Heights, NY 10598; pp. 15.

Che. Limei, "Heatgraph A Topology Based Heatmap Graph", vis.pku.edu.cn/wiki/_media/public_course/visclass . . ./chelimei-final-annotated.pdf, Oct. 14, 2012 (3 pages).

Extended European Search Report received in EP Application No. 12889605.7, Jul. 8, 2016, 8 pages.

* cited by examiner

DISPLAYING INFORMATION TECHNOLOGY CONDITIONS WITH HEAT MAPS

BACKGROUND

Information technology (IT) systems are generally monitored so that remedial action can fix issues that arise. An information technology system administrator is notified of the system's issues usually through graphs, gauges, dash boards, or other visual indicators that depict the system's conditions. Upon notice of such an issue in the system, the administrator searches for the issue's root cause to resolve the issue as quickly as possible.

BRIEF DESCRIPTION OF THE DRAWINGS

The accompanying drawings illustrate various examples of the principles described herein and are a part of the specification. The illustrated examples are merely examples and do not limit the scope of the claims.

DETAILED DESCRIPTION

The indicators that notify the administrator of IT issues are often limited to a specific area of the IT system. Furthermore, graphs and gauges generally depict specific parameters of the IT system, such as processing usage, available memory, or other parameters. However, these indicators fail to give the administrator a general overview of the entire IT system's condition.

The principles described herein include a method for displaying IT conditions to an administrator such that the administrator gets a global feel for the issues in the IT system, as well as which areas of the IT system are impacted the most. Such a method saves the administrator time that would otherwise be used searching through lists, tables, or other indicators. Such a method includes determining a severity value of current issues for each configuration item in an IT system; generating a graph of the configuration items that visually depict topological relationships between the configuration items, the graph having a heat map overlay; and assigning pixel colors for each configuration item in the heat map overlay according to their severity value.

In the following description, for purposes of explanation, numerous specific details are set forth in order to provide a thorough understanding of the present systems and methods. It will be apparent, however, to one skilled in the art that the present apparatus, systems, and methods may be practiced without these specific details. Reference in the specification to "an example" or similar language means that a particular feature, structure, or characteristic described is included in at least that one example, but not necessarily in other examples.

Figure 1:
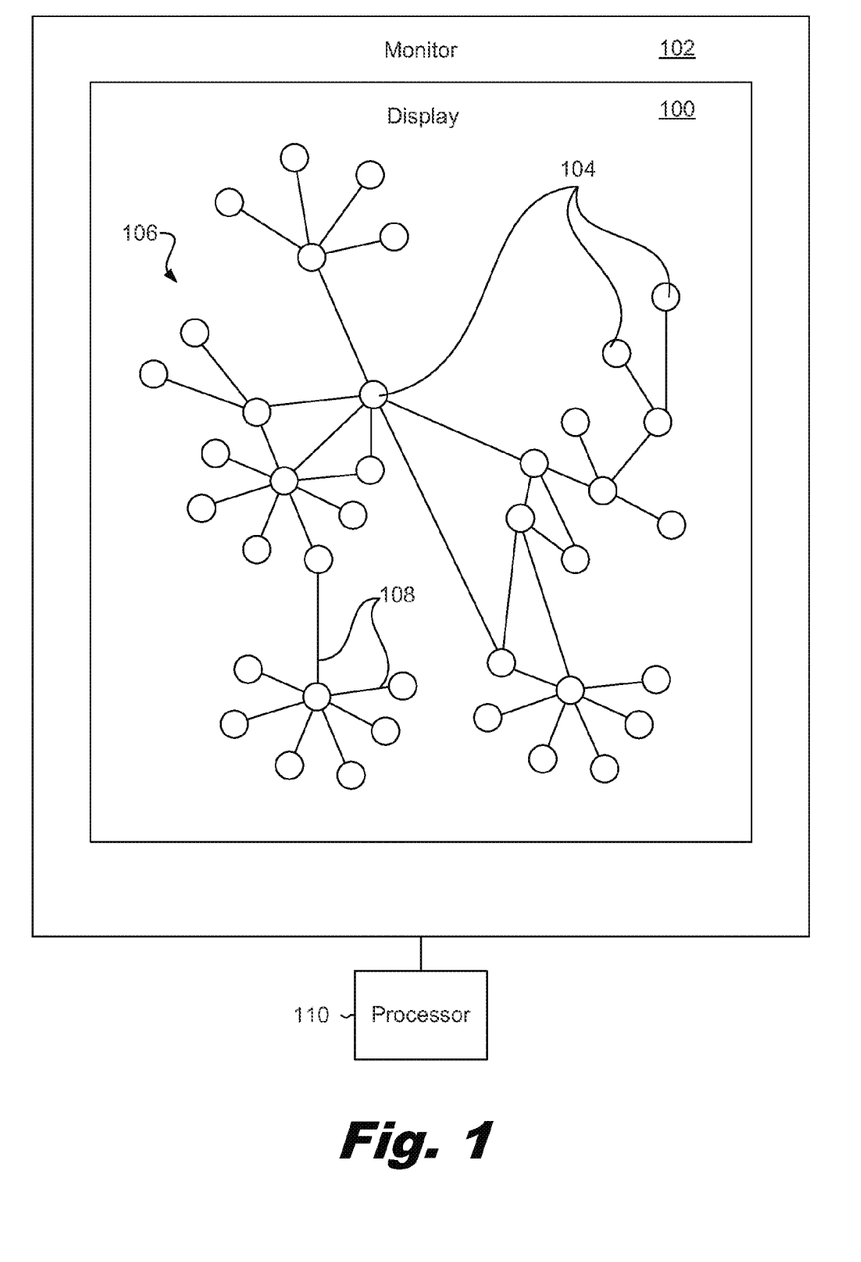
FIG. 1 is a diagram of an example of a graph according to principles described herein.

FIG. 1 is a diagram of an example of a graph (100) according to principles described herein. In this example, a monitor (102) has a display (100) that depicts an IT system of configuration items (104). A configuration item (104) is any component of an information technology environment, such as the IT system (106), that is under control of configuration management. The configuration items (104) are generally identifiable with identification numbers. A configuration item (104) may be hardware, virtual IT components, documentation, programs, other IT components, of combinations thereof.

The IT system's topology is depicted with solid lines (108) showing the logical connection between each of the configuration items (104). A logical connection refers to how a user perceives that the configuration items (104) are connected verses the physical connection of how the configuration items are physically linked to one another. The logical connections may be connections made between configuration items (104) that are made in higher network layers than the physical layer. For example, a logical connection uses the physical connections to establish a dedicated source-destination pair between configuration items (104). Communications through the logical connection are routed through physical connections from the source IT component to the destination IT component.

Monitoring tools are used to determine the location of each configuration item (104) in the IT system (106). The monitoring tools may be code from a downloadable installation package that installs onto each of the configuration items. Such code, installed on each configuration item, reports the configuration item's location to a common processor. The code determines the configuration item's logical location by causing a processor of the configuration item (104) to broadcast a query to all of the other configuration items to which it has a logical connection. In such an example, the code determines that a logical connection is established with those configuration items that respond to the query. In other examples, the monitoring tools are part of external devices that actively determine the logical locations of each configuration item (104) in the IT system (106).

The monitoring tools also determine whether there is an issue with any of the configuration items (104). An IT issue may include slow processing speeds, high memory usage, high processing capacity usage, incompatibility due to change events, unavailability, slow response times, high error rates, high failures rates, corrupted data, other issues, or combinations thereof. Often, an issue with one configuration item affects the configuration items to which it is connected. For example, if a first configuration item has a slow processing speed, and a second configuration item is dependant upon the first configuration item to process a particular task, the second configuration item will appear to have an issue as well as the first configuration item. Due to such independency of the configuration items in an IT system, an issue with one configuration item may affect hundreds of other configuration items. Such interdependency makes identifying the root cause of the issue, which in this example is the first configuration item, difficult for an administrator who just sees details about the second configuration item.

The monitoring tools also determine a severity of the identified issues. For example, a configuration item that is running at half of its efficiency has an issue severity that is less than a configuration item that is running at just ten percent of its efficiency. A severity of a configuration item may be determined by a severity policy that considers multiple factors. The policy's factors may include response times, error rates, failures rates, duration of the issue, the configuration item's maximum healthy abilities verses its current abilities, processing speed, memory usage, temperature, amount of corrupted data, other factors, or combinations thereof. In some examples, the factors are weighted so that some of the issue's symptoms more heavily influence the severity value. In other examples, a just a few factors equally determine the severity value.

The monitor is in communication with a processor (110) that is programmed to generate a heat map overlay and depict areas of the overlay according to their issue severity with pixel colors. More details about the heat map overlay will be described below.

Figure 2:
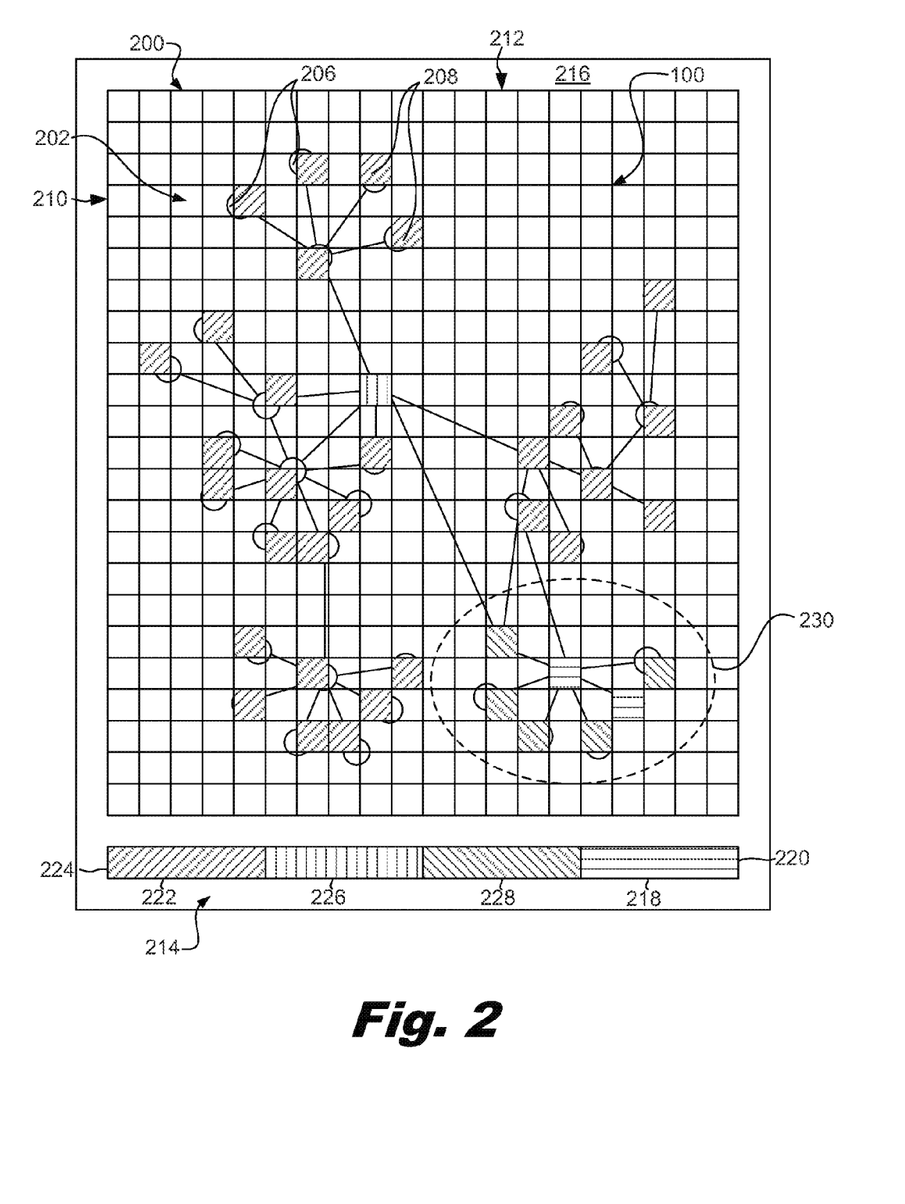
FIG. 2 is a diagram of an example of a heat map overlay according to principles described herein.

FIG. 2 is a diagram of an example of a heat map overlay (200) according to principles described herein. In this example, the heat map overlay (200) is overlaid on the graph (202) that depicts the IT system of the configuration items (206). The heat map overlay (200) has multiple display regions (208), each with at least one pixel, that are addressable in rows (210) and columns (212) over the graph (202). If the rows are associated with an x coordinate and the columns are associated with a y coordinate, the incoming signals from the monitoring tools may be addressable with x,y coordinates. The heat map overlay (200) is a transparent overlay of a heat map that depicts the values in the display regions (208) as represented with pixel colors.

In some examples, the heat map overlay (200) has the same dimensions as the graph (202). In other examples, the heat map overlay (200) has a larger area than the graph (202) and accommodates expansions and contractions of the graph (202) as configuration items (206) are added or removed from the IT topology. In other examples, the graph (202) enlarges or shrinks to fill the dimensions of the heat map overlay (200) as configuration items (206) are added or removed.

When the heat map overlay (200) is overlain over the graph (202), the locations of the configuration items (206) are determined with the display regions (208). For example, the display regions (208) that overlay the largest area of the configuration items (206) are determined to be the location to be mapped in the heat map overlay (200) for that particular configuration item. Since the configuration item's area may reside within four display regions at the same time, a mapping policy facilitates efficient mapping. The mapping policy may include a sub-policy that concludes that a display region (208) that overlaps with over fifty percent of the configuration item's area is automatically determined to be the mapped location. The policy may also include another sub-policy that concludes that a display region with less than twenty five percent of the symbol's area is not to be the mapped location. For those display regions (208) which contain between twenty five and fifty percent of the area, a comparison between the adjacent display regions determines which display region will be the mapped location.

The heat map overlay (200) consults with the monitoring tools to determine which pixel colors to assign to each mapped display region (208). The pixel colors represent the severity of the issues of the underlying configuration items (206). A color spectrum (214) is shown in the display (216) with the graph (202) and the heat map overlay (200). A first color (218) on a first side (220) of the color spectrum (214) represents a high color severity, while a second color (222) on a second side (224) of the color spectrum (214) represents low or no issue severity. The colors (226, 228) between the first and the second colors (218, 222) progress along a continuum from high to low severity. Thus, a user can determine the severity for each of the configuration items (206) by matching the pixel color with the color on the color spectrum (214).

By viewing the display (216) with the configuration items (206) arranged in their logical connection topology, a user gets a global feel for the location of the issues in the IT system and their severity. This is especially helpful when a display (216) depicts hot spots (230), logically approximate configuration items (206) that collectively exhibit a high level of severity. Due to the interdependency of the configuration items (206) in the IT system, a sever issue will affect the logically proximate configuration items (206). Thus, the hot spot (230) gives the user an indicator on where to dig deeper into the configuration items' infrastructure to determine the issue's root cause. In some examples, the color contrast of the severity issues is enough to draw attention of the hot spot (230) to the user. In other examples, the hot spot (230) is emphasized to catch the user's attention. The hot spot (230) may be emphasized with a halo effect, brighter colors, subtle shaking of the display regions, flashing of the display regions, alerts, other emphasizing mechanism, or combinations thereof.

The colors depicting the severity of the issue can be extended beyond the configuration item's mapped location. For example, as the severity of the issue increases, the pixel color correspondingly changes to reflect the higher intensity, and the area on the heat map overlay immediately adjacent to the mapped location may display a halo of color for lower severity. To the user, such a color arrangement appears as heat distribution with a hot spot (the mapped location depicting a high severity color) generating heat that spreads to the immediately proximate areas. The colors that appear to be distributed heat will have a lower color severity. Depicting the severity in the IT system like heat distribution is useful because a user readily understands heat distribution patterns and can liken the visual affect to severity.

In situations where two configuration items are mapped close together and both have a high severity, the high severity colors from these configuration item may merge to fill the gap between the configuration items' mapped locations much like two heat sources would generate a high amount of heat between each other. The severity exhibited by these close configuration items may be generated due to different types of issues. For example, the first of the two close configuration items may have a severity value based on a slow processing speed while the other configuration item has a high severity value based on a high error rate. Throughout the heat map overlay, the severity exhibited by each configuration item may be due to different issue types, but the degree of the severity is represented with the same colors.

To assist the user in likening the severity of an issue with temperature, red is used to depict the highest value of severity and blue is used to depict a low level of severity. A color spectrum between red and blue represents the progressively different values of severity; much like these same colors could be used to represent changes in temperature.

As the severity value at the mapped locations lowers, the colors change in such a manner as to appear as though the mapped location is cooling off by changing the colors progressively from a high severity to a lower severity. This procedure allows the display of severity to be consistent with mimicking heat distribution patterns, so the user can readily recognize the lower severity value. In some examples, a low severity color remains for a short period of time after the configuration item discontinues exhibiting any IT issues, so that the user can readily understand where the issues were recently in relation to the current area of the IT system.

Further, the user can identify to which logical region of the IT system (206) that the issue is spreading or is restricted. This information is not readily available to a user that sorts through tables, charts, lists, or other non-visual indicators. Thus, the principles described herein readily reveal additional useful information that is not otherwise available to the user. In some circumstances, by knowing the size and scope of the hot spot (230), a user can narrow the possible root causes of the issues to the configuration items (206) within the hot spot (230). Thus, the overview of the IT topology with the severity colors mapped to the configuration items (206) gives the user a starting point to narrow the possible root cause suspects. The user may use additional diagnostic tools to determine the root cause based on the information in the heat map overlay (200).

The monitoring tools provide the severity information about each configuration item (206) to the display (216) in a continuous, real time process. This allows the user to view the most current conditions of the IT system. Thus, a user will observe color changes occurring in the display. The nature of the issue's root cause may be more readily diagnosed as a user observes how the severity of the issue develops.

For example, an administrator may be notified by an employee that his computer, a first configuration item, has an issue of not processing data. Accordingly, the administrator looks to the display (216) to understand the severity and nature of the issue by observing what else the issue affects. The administrator may notice that the employee's computer is within a hot spot (230) that is constantly changing its severity and scope. The administrator may notice that one of the hot spot's configuration items, a suspect, has a higher severity color than the computer. This gives the administrator a starting point where he can troubleshoot the suspect first to see if the rest of the issue resolves itself upon addressing the suspect. If the remainder of the issue does not resolve itself, then the administrator may try another suspect in the hot spot (230). Since the logically connected configuration items (206) in the hot spot (230) are not physically adjacent to each other and may be logically connected through a series of physical connections, the suspects that are affecting the employee's computer may be located at different physical locations and may not have been apparent suspects without the guidance provided with the display.

The topology of the IT system (206) changes in the display (216) as configuration items are connected and removed from the IT system. The data provided by the monitoring tools may be associated with a timestamp so that an administrator has access to past conditions of the IT system. This allows the administrator to view the changes in the issue severity and topology of the IT system over time, which provides additional dues in determining the issue's root cause.

A user can view the display without notice from others about IT issues. The display informs the user of the IT system's condition in real time, so the user has the most up-to-date information as possible. As a user notices an issue developing, the user can address the issue before the issue is noticed by other IT users. Further, since the user has a global view of the entire IT system, the user can identify which of the IT system's issues is more sever and address it first. Also, the user can rewind the display to view over time how the issues in the IT system originally developed. Thus, the principles described herein give the user valuable information to determine the root causes of the issue.

In some examples, a user has the capability of selecting a configuration item of interest in the display. The user may do this by hovering an icon over the configuration item, inputting the configuration item's address, providing touch inputs, providing voice commands, providing motion detected hand gestures, or providing other forms of inputs, or combinations thereof. In response to selecting the configuration item, the display reveals additional information about the configuration item. The additional information may appear to the side of the configuration item, in a new window, in another location in the display, or combinations thereof. The additional information may identify the type of configuration item, its manufacturer, the last time the configuration item was serviced, its processing speed, its error rate, its failure rate, its memory usage, its physical location, other information pertinent to identifying the configuration item and its condition.

Another advantage of the principles described herein is the scalability of the display. The same display may depict IT topologies of different sizes. In some examples, the IT topology shrinks to fit the dimensions of the display. Also, the display may have a zooming feature that allows the user to view hot spots or other portions of the IT topology in more detail, while still having the ability to zoom out to view the entire IT topology more globally. Regardless, of the size or the section of the graph being viewed, the display presents the IT system's condition to the user in a natural way that is easy for a user to understand.

Figure 3:
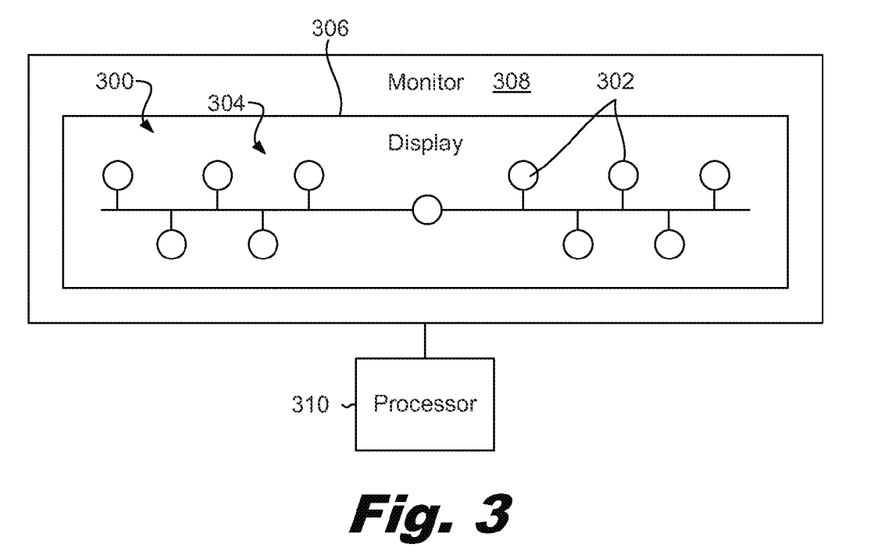
FIG. 3 is a diagram of an example of a graph according to principles described herein.

FIG. 3 is a diagram of an example of a graph (300) according to principles described herein. In this example, the graph (300) depicts a physical topological relationship between the configuration items (302) of the IT system (304) instead of the logical topological relationship as depicted in FIGS. 1 and 2. The physical topology of the IT system in this example is a bus topology. However, in other examples, the IT topology is a ring topology, a star topology, an extended star topology, a hierarchical topology, a mesh topology, another topology, or combinations thereof.

The physical topology may be determined through an installed code, as described above, or through external sensors. In some examples, the graph is a two dimensional representation of the physical topology. In other examples, the graph is a three dimensional topology that depicts where in a three dimensional space the configuration items reside in relation to each other. Such a three dimensional topology may be moved, rotated, or otherwise manipulated to allow the user to view specific regions of the physical topology as desired. In such an example, segments of the three dimensional topology may be removed temporarily from the rest of the topology for easier visual analysis.

The user may have an ability to switch between various configurations of the IT topology. For example, the user may switch between the physical topology and the logical topology. This allows the user to gain an overview of the IT system's conditions from different perspectives and may shorten the time to resolving the IT system's issues. In other examples, more than a physical or logical topological view is available to the user. For example, the display may depict the configuration items with different topological relationships that follow organizational structures, business relations, geography, other relationships, or combinations thereof.

The graph (300) is displayed in a display (306) of a monitor (308) that is in communication with a processor (310) for generating the heat map overlay. In examples where the user has an ability to switch between the IT topologies, the processor (310) responds by either generating a separate heat map overlay or remapping the configuration items with the appropriate severity colors. In some examples, where a user switches between IT topologies, the non-selected IT topology with corresponding graph and heat map overlay run in the back ground. In such an example, the monitoring tools continue to feed the graph and heat map overlay running in the background with severity values and any topology changes. If desired, when the user switches to the previously non-selected IT topology, the user can watch the changes in the IT system over time with a time slider function. Thus, the user loses no information by switching between different IT topologies.

Figure 4:
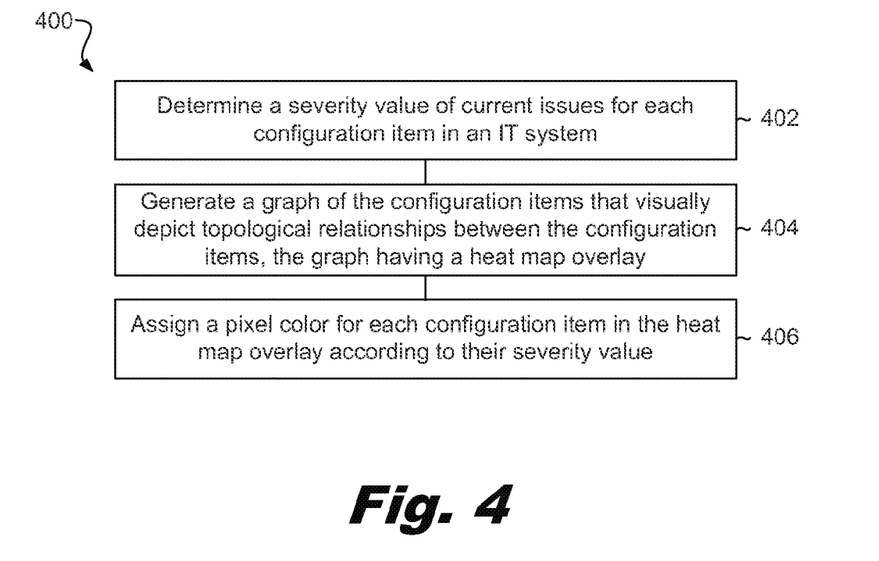
FIG. 4 is a diagram of an example of a method for displaying IT conditions with heat maps according to principles described herein.

FIG. 4 is a diagram of an example of a method (400) for displaying IT conditions with heat maps according to principles described herein. In this example, the method (400) includes determining (402) a severity value of current IT issues for each configuration item in an IT system; generating (404) a graph of the configuration items that visually depict topological relationships between the configuration items, the graph having a heat map overlay; and assigning (406) a pixel color for each configuration item in the heat map overlay according to their severity value.

The pixel colors are assigned in real time. If desired by the user, the changes to the heat map may be displayed over time. The pixel colors are selected from a color spectrum where a first color on a first end of the color spectrum represents a high severity value and a second color on a second end of the color spectrum represents a low severity value. The severity value is based on a severity policy, which may be based on response times, error rates, failure rates, other characteristics exhibited by the configuration items, or combinations thereof.

A topological area of the IT system may appear as a hot spot when a cluster of topologically proximate configuration items have a high severity value, which aids the user in understanding the global severity and scope of the issue. The topological relationships depicted in the graph aid the user in understanding the how the issue is affecting other portions of the IT system. The topological relationships may be physical relationships, logical relationships, other relationships, or combinations thereof.

Figure 5:
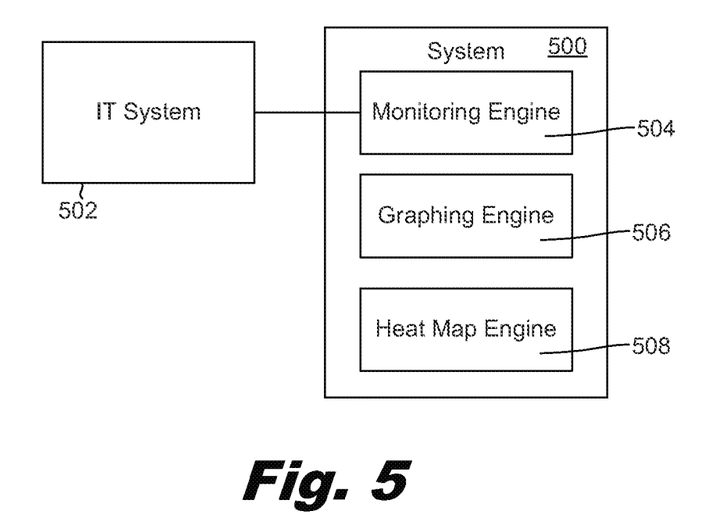
FIG. 5 is a diagram of an example of a display system according to principles described herein.

FIG. 5 is a diagram of an example of a display system (500) according to principles described herein. In this example, an IT system (502) is in communication with the display system (500) through the monitoring engine (504). The display system (500) also includes a graphing engine (506) and a heat map engine (508). The engines (504, 506, 508) refer to a combination of hardware and program instructions to perform a designated function. Each of the engines (504, 506, 508) may include a processor and memory. The program instructions are stored in the memory and cause the processor to execute the designated function of the engine.

The monitoring engine (504) feeds data gathered about the IT system (502) to the graphing engine (506) about the logical or physical location of the configuration items in the IT system (502). In response to receiving the configuration item's location, the graphing engine (504) creates a graph depicting the topology of the IT system (502). The monitoring engine (504) also feeds the graphing engine (506) the severity of issues exhibited by each of the configuration items.

The heat map engine (508) overlays a heat map overlay on the graph and maps the location of each of the configuration items to the overlay's display regions. The severity value of the configuration items is used by the heat map engine to assign an appropriate severity color to each of the mapped display regions on the heat map overlay. Other engines may be used to display additional information about each of the configuration items in the display, to display the changes to the heat map over time, to perform an additional task, or combinations thereof.

Figure 6:
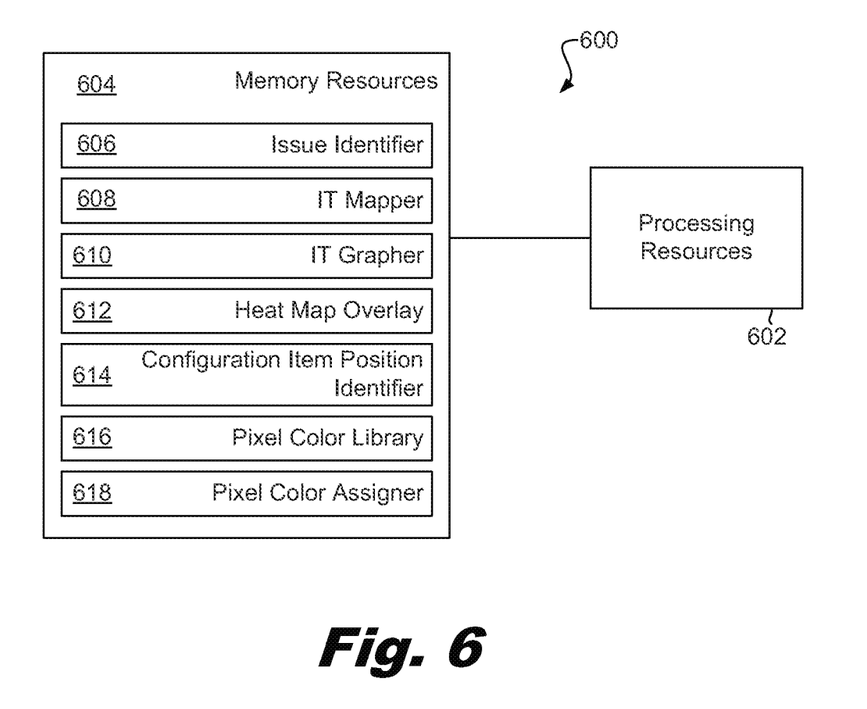
FIG. 6 is a diagram of an example of a display system according to principles described herein.

FIG. 6 is a diagram of an example of a display system (600) according to principles described herein. In this example, the display system (600) includes processing resources (602) that are in communication with memory resources (604). Processing resources (602) include at least one processor and other resources used to process programmed instructions. The memory resources (604) represent generally any memory capable of storing data such as programmed instructions or data structures used by the display system (600). The programmed instructions shown stored in the memory resources (604) include an issue identifier (606), an IT mapper (608), an IT grapher (610), a heat map overlay (612), a configuration item position identifier (614), and a pixel color assigner (618). The data structures shown stored in the memory resources (604) include a pixel color library (616).

The memory resources (604) include a computer readable storage medium that contains computer readable program code to cause tasks to be executed by the processing resources (602). The computer readable storage medium may be tangible and/or non-transitory storage medium. A non-exhaustive list of computer readable storage medium types includes non-volatile memory, volatile memory, random access memory, memristor based memory, write only memory, flash memory, electrically erasable program read only memory, or types of memory, or combinations thereof.

The issue identifier (606) represents programmed instructions that, when executed, cause the processing resources (602) to identify issues in the IT system. The IT mapper (608) represents programmed instructions that, when executed, cause the processing resources (602) to identify the locations of the configuration items of the IT system. The IT grapher (610) represents programmed instructions that, when executed, cause the processing resources (602) to graph the IT system's topology to a graph.

The heat map overlay (612) represents programmed instructions that, when executed, cause the processing resources (602) to overlay a heat map over the graph. The heat map overlay indicates the severity value of each configuration item in the graph with a pixel color. The configuration item position identifier (614) represents programmed instructions that, when executed, cause the processing resources (602) to identify and map the locations of the configuration items of the graph to the heat map overlay. A pixel color assigner (618) represents programmed instructions that, when executed, cause the processing resources (602) to assign a color from the pixel color library that represents the severity value of the appropriate configuration item.

Further, the memory resources (604) may be part of an installation package. In response to installing the installation package, the programmed instructions of the memory resources (604) may be downloaded from the installation package's source, such as a portable medium, a server, a remote IT location, another location, or combinations thereof. Portable memory media that are compatible with the principles described herein include DVDs, CDs, flash memory, portable disks, magnetic disks, optical disks, other forms of portable memory, or combinations thereof. In other examples, the program instructions are already installed.

Here, the memory resources can include integrated memory such as a hard drive, a solid state hard drive, or the like.

In some examples, the processing resources (602) and the memory resources (604) are located within the same physical component, such as a server, or an IT component. The memory resources (604) may be part of the physical component's main memory, caches, registers, non-volatile memory, or elsewhere in the physical component's memory hierarchy. Alternatively, the memory resources (604) may be in communication with the processing resources (602) over an IT system. Further, the data structures, such as the libraries and may be accessed from a remote location over a network connection while the programmed instructions are located locally. Thus, the display system (600) may be implemented on a user device, on a server, on a collection of servers, or combinations thereof.

The display system (600) of FIG. 6 may be part of a general purpose computer. However, in alternative examples, the display system (600) is part of an application specific integrated circuit.

Figure 7:
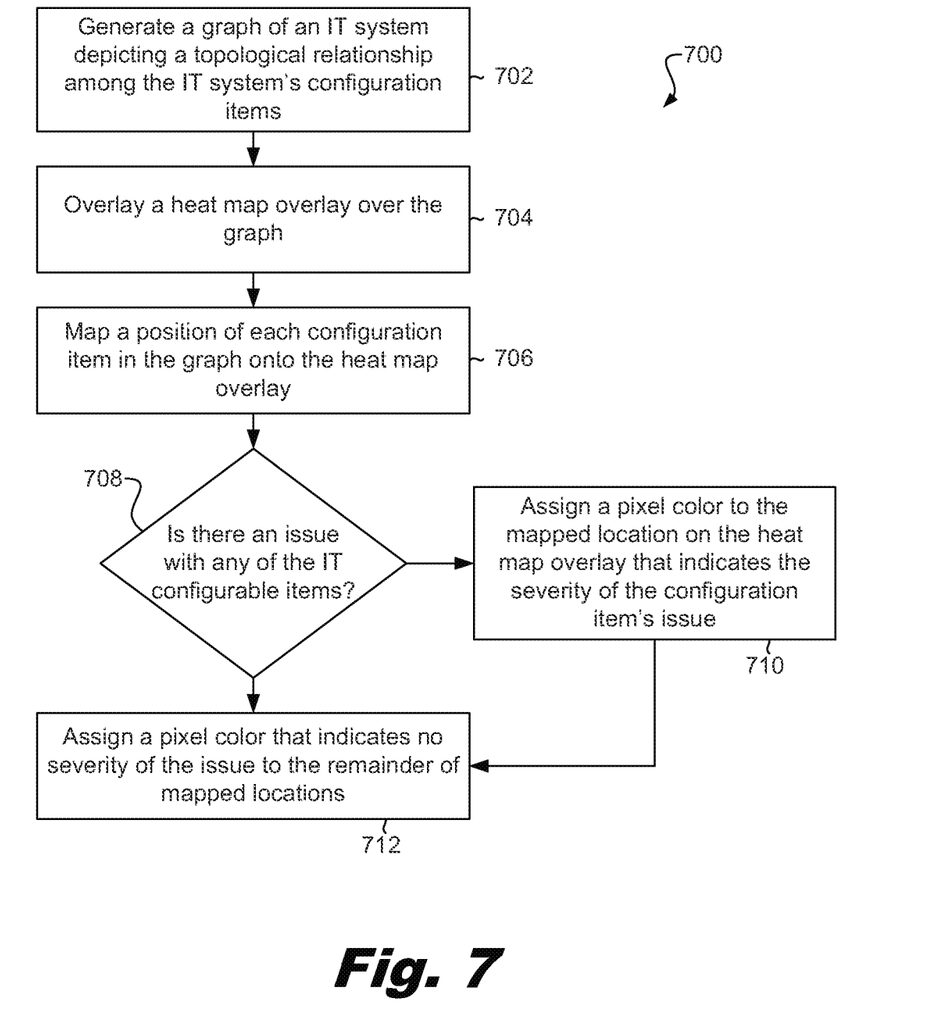
FIG. 7 is a diagram of an example of a flowchart of a process for displaying IT conditions with heat maps according to principles described herein.

FIG. 7 is a diagram of an example of a flowchart (700) of a process for displaying IT conditions with heat maps. In this example, the process includes generating (702) a graph of an IT system depicting a topological relationship among the IT system's configuration items, overlaying (704) a heat map overlay over the graph, and mapping (706) a position of each configuration item in the graph onto the heat map overlay. The process also includes determining (708) whether there is an issue with any of the IT system's configuration items. If there is an issue, then the process includes assigning (710) a pixel color to the mapped location on the heat map overlay that indicates the severity of the configuration item's issue. The remainder of the mapped locations is assigned (712) a pixel color that indicates no severity of an issue exists.

While the examples above have been described with reference to specific numbers of colors and color types, any number of colors or color types may be used in accordance with the principles described herein. Further, while the examples above have been described with reference to specific ways of determining a severity value, any policy, mechanism, or function to determine severity values compatible with the principles described herein may be used. Also, while the examples above have been described with reference to specific ways of mapping a configuration item to a heat map overlay, any mechanism for mapping the configuration items may be used in accordance with the principles described herein. While the examples above have been described with reference to specific formats for depicting the IT system's topology, any display arrangement for depicting the topology may be used.

The preceding description has been presented only to illustrate and describe examples of the principles described. This description is not intended to be exhaustive or to limit these principles to any precise form disclosed. Many modifications and variations are possible in light of the above teaching.

What is claimed is:

1. A computer program product for displaying information technology conditions with heat maps, comprising:
   a tangible computer readable storage medium, said tangible computer readable storage medium comprising computer readable program code embodied therewith, said computer readable program code comprising program instructions that, when executed, causes a processor to:
   determine a severity value of current issues for each configuration item of a plurality of configuration items of an information technology system, wherein the current issues are associated with a plurality of different issue types;
   generate a graph of said plurality of said configuration items that visually depicts topological relationships between said plurality of configuration items, said graph comprising a heat map overlay;
   assign pixel colors for each configuration item in said heat map overlay according to their severity value, wherein a region of said heat map overlay comprises a first pixel color of the pixel colors associated with a relatively higher severity value;
   display a second pixel color associated with a relatively lower severity value in said heat map overlay; and
   surround the region with the second pixel color to highlight the first pixel color.

2. The computer program product of claim 1, further comprising computer readable program code to, when executed, cause said processor to cause a topological area of said information technology system to appear as a hot spot when a cluster of topologically proximate configuration items have a high severity value.

3. The computer program product of claim 1, wherein said pixel colors are selected from a color spectrum where a first color on a first end of said color spectrum represents a high severity value and a second color on a second end of said color spectrum represents a low severity value.

4. The computer program product of claim 1, further comprising computer readable program code to, when executed, cause said processor to assign said pixel colors in real time.

5. The computer program product of claim 1, wherein said topological relationships are physical topological relationships.

6. The computer program product of claim 1, wherein said topological relationships are logical topological relationships.

7. The computer program product of claim 1, further comprising computer readable program code to, when executed, cause said processor to display heat map changes over time.

8. The computer program product of claim 1, wherein said severity value is based on response times, error rates, failures rates, or combinations thereof.

9. The computer program product of claim 1, wherein the topological relationships comprise a bus topology.

10. The computer program product of claim 9, wherein the bus topology comprises a ring topology, a star topology, an extended star topology, a hierarchical topology or a mesh topology.

11. The computer program product of claim 1, wherein the topology comprises a three dimensional topology depicting in a three dimensional space relationships of the configuration items relative to each other.

12. The computer program product of claim 1, wherein the program code comprises instructions that, when executed by the processor, cause the processor to:
   receive user input representing selection of physical topological relationship between said plurality of configuration items and logical topological relationships between said plurality of configuration items; and
   display the physical topological relationships in the graph or display the logical topological relationships in the graph based on the user input.

13. The computer program product of claim 1, wherein the program code comprises instructions that, when executed by the processor, cause the processor to form a halo in said heat map overlay around the region using the second color.

14. A system for displaying information technology conditions with heat maps, comprising:
a monitoring engine to identify current issues of configuration items of an information technology system, wherein the current issues are associated with a plurality of different issue types;
a graphing engine to generate a graph of said configuration items in their topological relationships; and
a heat map engine to:
overlay a heat map overlay on said graph;
locate a corresponding position of said configuration items in said heat map overlay;
assign severity pixel colors for each configuration item of said configuration items with said current issues in said heat map overlay according to a severity value, wherein a region of said heat map overlay comprises a first pixel color of the severity pixel colors associated with a relatively higher severity value;
display a second pixel color associated with a relatively lower severity value in said heat map overlay;
surround the region with the second pixel color to highlight the first pixel color; and
assign a third pixel color for each configuration item of said configuration items without said current issues in said heat map overlay.

15. The system of claim 14, wherein said heat map engine assigns said severity pixel colors and said third pixel color or colors in real time.

16. The system of claim 12, wherein said plurality of configuration items comprise hardware items of the information technology system.

17. A method for displaying information technology conditions with heat maps, comprising:
determining a severity value of current issues for each configuration item of a plurality of configuration items of an information technology system, wherein the current issues are associated with a plurality of different issue types;
generating a graph of said plurality of configuration items that visually depicts topological relationships between said plurality of configuration items;
overlaying a heat map overlay on said graph;
locating corresponding positions of said plurality of configuration items in said heat map overlay;
assigning pixel colors for each configuration item of the plurality of configuration items in said heat map overlay according to said severity value associated with each configuration item wherein a region of said heat map overlay comprises a first pixel color of the pixel colors associated with a relatively higher severity value;
displaying a second pixel color associated with a relatively lower severity value in said heat map overlay; and
surrounding the region with the second pixel color to highlight the first pixel color.

18. The method of claim 17, wherein assigning pixel colors for each configuration item in said heat map overlay includes assigning said pixel colors in real time.

19. The method of claim 17, wherein generating the graph comprises generating the graph based on a logical topology selection or a physical topology selection by a user.

* * * * *